US012739699B2

(12) United States Patent
Tseng et al.

(10) Patent No.: US 12,739,699 B2
(45) Date of Patent: Sep. 15, 2026

(54) LEAP FROG TECHNIQUES FOR TRANSMITTING BACK HAUL DATA IN A MESH WIRELESS LOCAL AREA NETWORK AND RELATED ACCESS POINTS

(71) Applicant: Ruckus IP Holdings LLC, Claremont, NC (US)

(72) Inventors: Meng-Kai Tseng, Taipei City (TW); Chiu-Yi Li, Taipei City (TW)

(73) Assignee: Ruckus IP Holdings LLC, Horsham, PA (US)

( * ) Notice: Subject to any disclaimer, the term of this patent is extended or adjusted under 35 U.S.C. 154(b) by 371 days.

(21) Appl. No.: 17/980,698

(22) Filed: Nov. 4, 2022

(65) Prior Publication Data

US 2023/0144370 A1 May 11, 2023

Related U.S. Application Data

(60) Provisional application No. 63/276,816, filed on Nov. 8, 2021.

(51) Int. Cl.

| | |
|---|---|
| ***H04W 28/086*** | (2023.01) |
| ***H04W 40/04*** | (2009.01) |
| *H04W 84/12* | (2009.01) |
| *H04W 84/22* | (2009.01) |
| *H04W 88/10* | (2009.01) |

(52) U.S. Cl.

CPC ......... *H04W 28/086* (2023.05); *H04W 40/04* (2013.01); *H04W 84/12* (2013.01); *H04W 84/22* (2013.01); *H04W 88/10* (2013.01)

(58) Field of Classification Search

CPC ... H04W 28/086; H04W 40/04; H04W 84/12; H04W 88/10; H04W 84/22

See application file for complete search history.

(56) References Cited

U.S. PATENT DOCUMENTS

| | | | | |
|---|---|---|---|---|
| 9,078,286 | B1 * | 7/2015 | Yuan | H04W 24/02 |
| 9,655,151 | B2 * | 5/2017 | Emord | H04W 24/02 |
| 11,140,457 | B1 * | 10/2021 | Jordan | H04N 21/64707 |
| 2009/0201898 | A1 * | 8/2009 | Gong | H04W 28/06 370/338 |
| 2009/0290562 | A1 * | 11/2009 | Wu | H04L 12/189 370/338 |
| 2012/0300759 | A1 * | 11/2012 | Patanapongpibul | H04W 48/14 370/338 |
| 2016/0050698 | A1 * | 2/2016 | Siomina | H04W 72/20 370/329 |

(Continued)

FOREIGN PATENT DOCUMENTS

| | | |
|---|---|---|
| WO | 2019017998 A1 | 1/2019 |

OTHER PUBLICATIONS

"International Search Report and Written Opinion for International Patent Application No. PCTUS22078868, mailed Feb. 13, 2023, 15 pages".

*Primary Examiner* — Mounir Moutaouakil

(74) *Attorney, Agent, or Firm* — Myers Bigel, P.A.

(57) ABSTRACT

A method of transmitting mesh backhaul data in a WiFi network comprises transmitting the mesh backhaul data between a root node and a first intervening mesh access point via a wireless communication in a first frequency band and transmitting the mesh backhaul data between the first mesh access point and a second mesh access point via a wireless communication in a second frequency band.

20 Claims, 6 Drawing Sheets

(56) References Cited

U.S. PATENT DOCUMENTS

| | | | | |
|---|---|---|---|---|
| 2020/0383170 | A1 | 12/2020 | Ganapathy et al. | |
| 2020/0413491 | A1 | 12/2020 | Ansley et al. | |
| 2021/0099915 | A1 | 4/2021 | Daniels et al. | |
| 2021/0153294 | A1* | 5/2021 | Seo | H04W 76/38 |
| 2021/0329547 | A1* | 10/2021 | Kim | H04W 52/0203 |
| 2021/0368439 | A1* | 11/2021 | Karimaruthumkal | H04L 5/0055 |
| 2021/0376973 | A1* | 12/2021 | Mallik | H04W 72/56 |
| 2022/0110119 | A1* | 4/2022 | Song | H04L 5/001 |
| 2023/0022414 | A1* | 1/2023 | Kim | H04L 1/1896 |
| 2023/0299987 | A1* | 9/2023 | Yao | H04L 12/18 370/389 |
| 2024/0332820 | A1* | 10/2024 | Noghanian | H01Q 9/045 |

* cited by examiner

LEAP FROG TECHNIQUES FOR TRANSMITTING BACK HAUL DATA IN A MESH WIRELESS LOCAL AREA NETWORK AND RELATED ACCESS POINTS

CROSS-REFERENCE TO RELATED APPLICATION

The present application claims priority under 35 U.S.C. § 119 to U.S. Provisional Patent Application Ser. No. 63/276,816, filed Nov. 8, 2021, the entire content of which is incorporated herein by reference herein.

BACKGROUND

The present invention generally relates to radio communications and, more particularly, to communications in mesh wireless local area networks.

A wireless local area network ("WLAN") refers to a network that operates in a limited area (e.g., within a home, school, store, campus, shopping mall, etc.) that interconnects two or more electronic devices using wireless radio frequency ("RF") communications. Electronic devices belonging to users ("clients") of a WLAN, such as smartphones, computers, tablets, printers, appliances, televisions, lab equipment and the like (herein "client devices"), can communicate with each other and with external networks such as the Internet over the WLAN. Since wireless communications are used, portable client devices can be moved throughout the area covered by the WLAN and remain connected to the network. Most WLANs operate under a family of standards promulgated by the Institute of Electrical and Electronics Engineers (IEEE) that are referred to as the IEEE 802.11 standards. WLANs operating under the IEEE 802.11 family of standards are commonly referred to as WiFi networks. Client devices that include a networking subsystem that includes a WiFi network interface can communicate over WiFi networks.

A WiFi network includes one or more access points (also referred to as hotspots) that are typically installed at fixed locations throughout the area covered by the WiFi network. The WiFi network can include a single access point that provides coverage in a very limited area or may include tens, hundreds or even thousands of access points that provide in-building and/or outdoor coverage to a large campus or region. Client devices communicate with each other and/or with wired devices that are connected to the WiFi network through the access points. The access points may be connected to each other and/or to one or more controllers through wired and/or wireless connections. The Win network typically includes one or more gateways that may be used to provide Internet access to the client devices and/or access to other external networks.

Many WiFi networks are implemented in whole or part as so-called mesh networks. A mesh network has one or more root nodes as well as a plurality of additional nodes, which are typically implemented as access points. The root node(s) provide wired backhaul to external networks. A root node may, for example, comprise an access point that is connected to one or more gateways via wired connections or may comprise another electronic device such as a router. In a mesh WiFi network, at least some of the access points (herein "mesh access points") do not include a wired connection to a root node, but instead communicate with one or more root nodes via wireless connections through other access points. Thus, a "source" mesh access point will transmit uplink mesh backhaul communications to a root node through one or more intervening access points, and the root node will transmit downlink mesh backhaul communications through one or more intervening access points to each "destination" mesh access point. In many cases, a mesh access point will be capable of communicating with multiple other mesh access points, and hence multiple communications paths may exist between each mesh access point and a given root node.

Mesh WiFi networks typically self-configure to automatically select the communications path(s) used for each uplink and downlink wireless backhaul communication. For the non-root access points of a mesh network, backhaul refers to communications between a non-root access point and a root node that are associated with communications between the non-root access point and client devices that are associated with the non-root access point. The backhaul from the non-root access points constitute wireless communications. The backhaul communications may flow in both the upstream direction (i.e., from the non-root access point to the root node) and in the downstream direction (i.e., from the root node to the non-root access point). Each backhaul communication may travel through one or more "hops," where each hop comprises a wireless communication link between two nodes on the communication path between the root node and the source/destination access point. A first access point along such a communication path is "downstream" of a second access point if the first access point is in between the second access point and the source/destination access point. Conversely, a first access point along such a communication path is "upstream" of a second access point if the second access point is in between the first access point and the source/destination access point. Mesh networks may cost effectively extend the wireless coverage of a WiFi network.

Early WiFi standards supported communication in the 2.401-2.484 GHz frequency range (herein "the 2.4 GHz frequency band"). Later WiFi standards supported communication in the 5.170-5.835 GHz frequency range (herein "the 5 GHz frequency band") Most modern access points support communications in both the 2.4 GHz and 5 GHz frequency bands, and have a radio for each frequency band. Recently, the United States Federal Communications Commission voted to open spectrum in the 5.935-7.125 GHz frequency range, which is referred to herein as "the 6 GHz frequency band," for use in WiFi applications, and many other countries are likewise in the process of allowing WiFi networks to operate in the 6 GHz frequency band.

SUMMARY

Embodiments of the present invention provide methods of transmitting mesh backhaul data in a WiFi network. Pursuant to these methods, the mesh backhaul data is transmitted between a root node and a first intervening mesh access point via a wireless communication in a first frequency band. The mesh backhaul data is then transmitted between the first intervening mesh access point and a second mesh access point via a wireless communication in a second frequency band.

In some embodiments, the mesh backhaul data is downlink mesh backhaul data, and the second mesh access point is a destination for the downlink mesh backhaul data. In other embodiments, the mesh backhaul data is downlink mesh backhaul data and the second mesh access point is a second intervening mesh access point. In such embodiments, the method may further comprise transmitting the downlink mesh backhaul data between the second intervening mesh access point and a third mesh access point via a wireless communication in the first frequency band.

In some embodiments, the mesh backhaul data is uplink mesh backhaul data, and the second mesh access point is a source of the uplink mesh backhaul data. In other embodiments, the mesh backhaul data is uplink mesh backhaul data and the second mesh access point is a second intervening mesh access point. In such embodiments, the method may further comprise transmitting the uplink mesh backhaul data between the second intervening mesh access point and a third mesh access point via a wireless communication in the first frequency band, wherein the uplink mesh backhaul data is first transmitted from the third mesh access point to the second intervening mesh access point, and then is transmitted from the second intervening mesh access point to the first intervening mesh access point, and then is transmitted from the first intervening mesh access point to the root node.

In some embodiments, a second portion of the mesh backhaul data is transmitted between the first mesh intervening access point and the second mesh access point at the same time that a first portion of the mesh backhaul data is transmitted between the root node and the first intervening mesh access point.

In some embodiments, the first frequency band is one of a 5.170-5.835 GHz frequency band and a 5.935-7.125 GHz frequency band, and the second frequency band is the other of the 5.170-5.835 GHz frequency band and the 5.935-7.125 GHz frequency band.

In some embodiments, the first frequency band is one of a 5.170-5.330 GHz frequency band and a 5.490-5.835 GHz frequency band, and the second frequency band is the other of the 5.170-5.330 GHz frequency band and the 5.490-5.835 GHz frequency band.

In some embodiments, the first intervening mesh access point selects the first frequency band for exchanging mesh backhaul data with the root node, and advertises the selection of the first frequency band in a beacon.

In some embodiments, the second mesh access point selects the second frequency band for exchanging mesh backhaul data with the first intervening mesh access point based on the advertisement of the selection of the first frequency band in the beacon.

According to further embodiments of the present invention, methods of operating an access point are provided. Pursuant to these methods, a first wireless local area network is enabled for mesh downlink traffic, where the first wireless local area network supports wireless communication in a first frequency band. A second wireless local area network is enabled for mesh downlink traffic, where the second wireless local area network supports wireless communication in a second frequency band that is different from the first frequency band. Downlink mesh backhaul data is received over the first wireless local area network. The downlink mesh backhaul data is transmitted over the second wireless area network.

In some embodiments, a first portion of the downlink mesh backhaul data is transmitted over the second wireless local area network at the same time that a second portion of the downlink mesh backhaul data is received over first wireless local area network.

In some embodiments, the first frequency band is one of a 5.170-5.835 GHz frequency band and a 5.935-7.125 GHz frequency band, and the second frequency band is the other of the 5.170-5.835 GHz frequency band and the 5.935-7.125 GHz frequency band. In other embodiments, the first frequency band is one of a 5.170-5.330 GHz frequency band and a 5.490-5.835 GHz frequency band, and the second frequency band is the other of the 5.170-5.330 GHz frequency band and the 5.490-5.835 GHz frequency band.

In some embodiments, the method may further include selecting one of the first frequency band and the second frequency band for uplink mesh backhaul data communication.

In some embodiments, the method may further include enabling a third wireless local area network for mesh downlink traffic, where the third wireless local area network supports wireless communication in the first frequency band.

According to further embodiments of the present invention, access points are provided. These access points include at least one antenna and an interface circuit that is coupled to the at least one antenna and configured to enable a first wireless local area network in a first frequency band for mesh backhaul data, enable a second wireless local area network in a second frequency band for mesh backhaul data, receive mesh backhaul data on the first wireless local area network, and transmit the mesh backhaul data on the second wireless local area network.

In some embodiments, the interface circuit is further configured so that the access point can receive mesh backhaul data on the first wireless local area network while simultaneously transmitting the mesh backhaul data on the second wireless local area network.

In some embodiments, the first wireless local area network supports uplink communications and the second wireless local area network supports downlink communications.

In some embodiments, the first frequency band is one of a 5.170-5.835 GHz frequency band and a 5.935-7.125 GHz frequency band, and the second frequency band is the other of the 5.170-5.835 GHz frequency band and the 5.935-7.125 GHz frequency band. In other embodiments, the first frequency band is one of a 5.170-5.330 GHz frequency band and a 5.490-5.835 GHz frequency band, and the second frequency band is the other of the 5.170-5.330 GHz frequency band and the 5.490-5.835 GHz frequency band.

BRIEF DESCRIPTION OF THE DRAWINGS

Like reference numerals refer to corresponding parts throughout the drawings. Moreover, multiple instances of the same part may be designated by a common prefix separated from an instance number by a dash.

DETAILED DESCRIPTION

Figure 1:
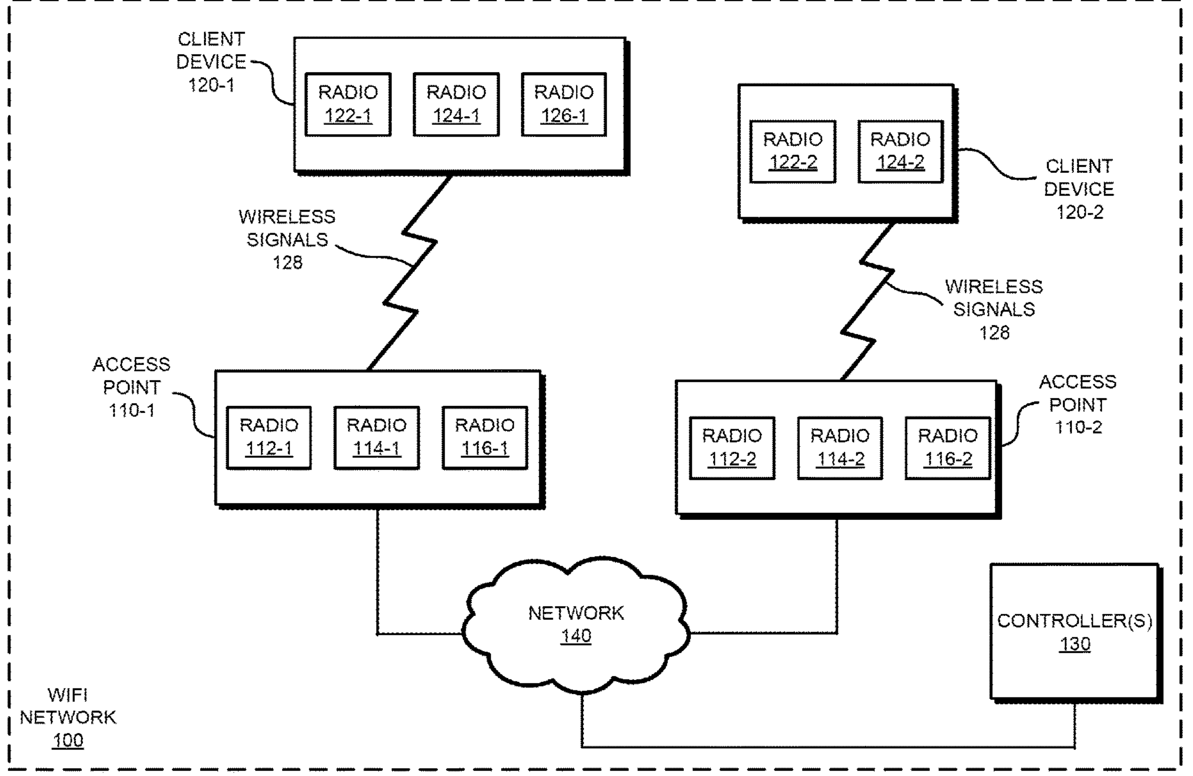
FIG. 1 is a block diagram illustrating an example of a simplified WiFi network in which the communication techniques according to embodiments of the present invention may be practiced.

As discussed above, WiFi networks are now authorized to operate in the 5.935-7.125 GHz frequency range, which is referred to herein as "the 6 GHz frequency band." With the opening of the 6 GHz frequency band for WiFi communications, so-called "tri-band" WiFi access points are being developed that will include a first radio that operates in the 2.401-2.484 GHz frequency range (herein "the 2.4 GHz frequency band"), a second radio that operates in the 5.170-5.835 GHz frequency range (herein "the 5 GHz frequency band") and a third radio that operates in the 6 GHz frequency band.

In conventional WiFi networks, mesh backhaul communications are supported in a single frequency band, which is usually the 5 GHz frequency band. One disadvantage of this approach is that the radio supporting mesh backhaul communications in an intervening mesh access point cannot simultaneously receive and transmit mesh backhaul communications. Thus, for example, an intervening mesh access point that is receiving a downlink communication (i.e., a communication flowing in the direction from the root node toward a client device) cannot forward that downlink communication to another downstream mesh access point (either another intervening mesh access point or the destination access point) at the same time. The inability to both receive 5 GHz communications from the root node while simultaneously transmitting 5 GHz communications to the next downstream access point can reduce backhaul throughput by as much as 50%.

Pursuant to embodiments of the present invention, WiFi networks are provided in which mesh backhaul communications are supported in at least two different frequency bands. This allows an intervening mesh access point to receive mesh backhaul communications using a first frequency band radio and to simultaneously transmit the received mesh backhaul communications using a second frequency band radio. In other words, the intervening access point does not need to buffer received mesh backhaul communications until the full mesh backhaul communication is received prior to transmitting the received mesh backhaul communication to the next node along the communication path to the destination access point. This may increase throughput by up to nearly a factor of two over conventional approaches.

In some embodiments, each access point along the communication path between the root node and the source/destination access point may be configured to automatically select which frequency band to use for the mesh backhaul communications based on which frequency band will provide the highest throughput. In such embodiments, adjacent nodes on the mesh backhaul communications path will almost always alternate between the two frequency bands for two reasons. First, as discussed above, if a node receives mesh backhaul communications over a first frequency band link, it will almost always be advantageous to forward those backhaul communications over a second frequency band link, as that allows the forwarding transmissions to start as soon as the access point processes the received communication, since the second and frequency band radio can transmit signals while the first frequency band radio is still receiving signals. Second, the mesh backhaul communications received in the first frequency band at the intervening access point will typically appear as interference to any mesh backhaul communications that are transmitted by the intervening access point in the first frequency band, due to the fact that there is overlap between many of the channels in each WiFi frequency band. No such overlap exists between channels in different WiFi frequency bands, and hence having adjacent hops on the communication path use different frequency bands will typically maximize throughput. In light of this, in some embodiments the root node (for downlink communications) may select between the first and second frequency bands based on some criteria (e.g., throughput) and then subsequent links in the communication path may simply alternate between frequency bands.

In some embodiments of the present invention, methods of transmitting mesh backhaul data in a WiFi network are provided. Pursuant to these methods, the mesh backhaul data is transmitted between a root node and a first intervening mesh access point via a wireless communication in a first frequency band. The mesh backhaul data is then transmitted between the first intervening mesh access point and a second mesh access point via a wireless communication in a second frequency band.

In other embodiments, methods of operating an access point are provided. Pursuant to these methods, a first wireless local area network is enabled for mesh downlink traffic, where the first wireless local area network supports wireless communication in a first frequency band. A second wireless local area network is enabled for mesh downlink traffic, where the second wireless local area network supports wireless communication in a second frequency band that is different from the first frequency band. Downlink mesh backhaul data is received over the first wireless local area network. The downlink mesh backhaul data is transmitted over the second wireless area network.

In still other embodiments, access points are provided. These access points include at least one antenna and an interface circuit that is coupled to the at least one antenna and configured to enable a first wireless local area network in a first frequency band for mesh backhaul data, enable a second wireless local area network in a second frequency band for mesh backhaul data, receive mesh backhaul data on the first wireless local area network, and transmit the mesh backhaul data on the second wireless local area network.

Embodiments of the present invention will now be described in further detail with reference to the figures.

FIG. 1 is a block diagram illustrating a simplified WiFi network 100 in which the communications techniques according to embodiments of the present invention may be used. As shown in FIG. 1, the WiFi network 100 may include one or more access points 110, one or more client devices 120 (such as cellular telephones, computers, tablets, printers and a wide range of other WiFi-capable electronic devices), and one or more optional controllers 130. The access points 110 may communicate with one or more of the client devices 120 using wireless communication that is compatible with an IEEE 802.11 standard. At least some of the access points 110 may be tri-band access points that include three access point radios. The access point radios may include first access point radios 112 that operate in the 2.4 GHz frequency band, second access point radios 114 that operate in the 5 GHz frequency band, and third access point radios 116 that operate in the 6 GHz frequency band. The client devices 120 may also include one or more client radios 122, 124, 126. The client radios may include first client radios 122 that operate in the 2.4 GHz frequency band, second client radios 124 that operate in the 5 GHz frequency band, and third client radios 126 that operate in the 6 GHz frequency band. Some client devices 120 may only include fewer than all of the first, second and third client radios 122, 124, 126, as shown in FIG. 1 (i.e., client device 120-2 only includes a 2.4 GHz client radio 122-2 and a 5 GHz client radio 124-2).

The access points 110 may also communicate with the one or more optional controllers 130 via a network 140, which may comprise, for example, the Internet, an intra-net and/or one or more dedicated communication links. It will also be appreciated that some access points 110 may only be connected to the network 140 through other access points 110 (e.g., in a mesh network implementation), as will be discussed in greater detail below.

Note that the optional controllers 130 may be at the same location as the other components in WiFi network 100 or may be located remotely (e.g., cloud based controllers 130). The access points 110 may be managed and/or configured by the controllers 130. The access points 110 may communicate with the controller(s) 130 or other services using wireless communications and/or using a wired communication protocol, such as a wired communication protocol that is compatible with an IEEE 802.3 standard (which is sometimes referred to as "Ethernet"), e.g., an Ethernet II standard. The access points 110 may provide the client devices 120 access to the network 140. The access points 110 may be physical access points or may be virtual access points that are implemented on a computer or other electronic device. While not shown in FIG. 1, the WiFi network 100 may include additional components or electronic devices, such as, for example, a router.

The access points 110 and the client devices 120 may communicate with each other via wireless communication. The access points 110 and the client devices 120 may wirelessly communicate by: transmitting advertising frames on wireless channels, detecting one another by scanning wireless channels, exchanging subsequent data/management frames (such as association requests and responses) to establish a connection and configure security options (e.g., Internet Protocol Security), transmit and receive frames or packets via the connection, etc.

As described further below with reference to FIG. 10, the access points 110, client devices 120 and/or the controllers 130 may include subsystems, such as a networking subsystem, a memory subsystem and a processor subsystem. The networking subsystems of the access points 110 may include the above-described access point radios 112, 114, 116, and the networking subsystems of the client device 120 may include the above-described client radios 122, 124, 126.

As can be seen in FIG. 1, wireless signals 128 (represented by a jagged line) are transmitted from one of the radios 122-1, 124-1, 126-1 in client device 120-1. These wireless signals 128 are received by the corresponding radio 112-1, 114-1, 116-1 in at least one of the access points 110, such as access point 110-1. The wireless signals 128 may comprise frames or packets that are received by access point 110-1. It will be appreciated that wireless signals 128 may flow in both directions, namely from a client device 120 to an access point 110, and from an access point 110 to a client device 120.

Figure 2A:
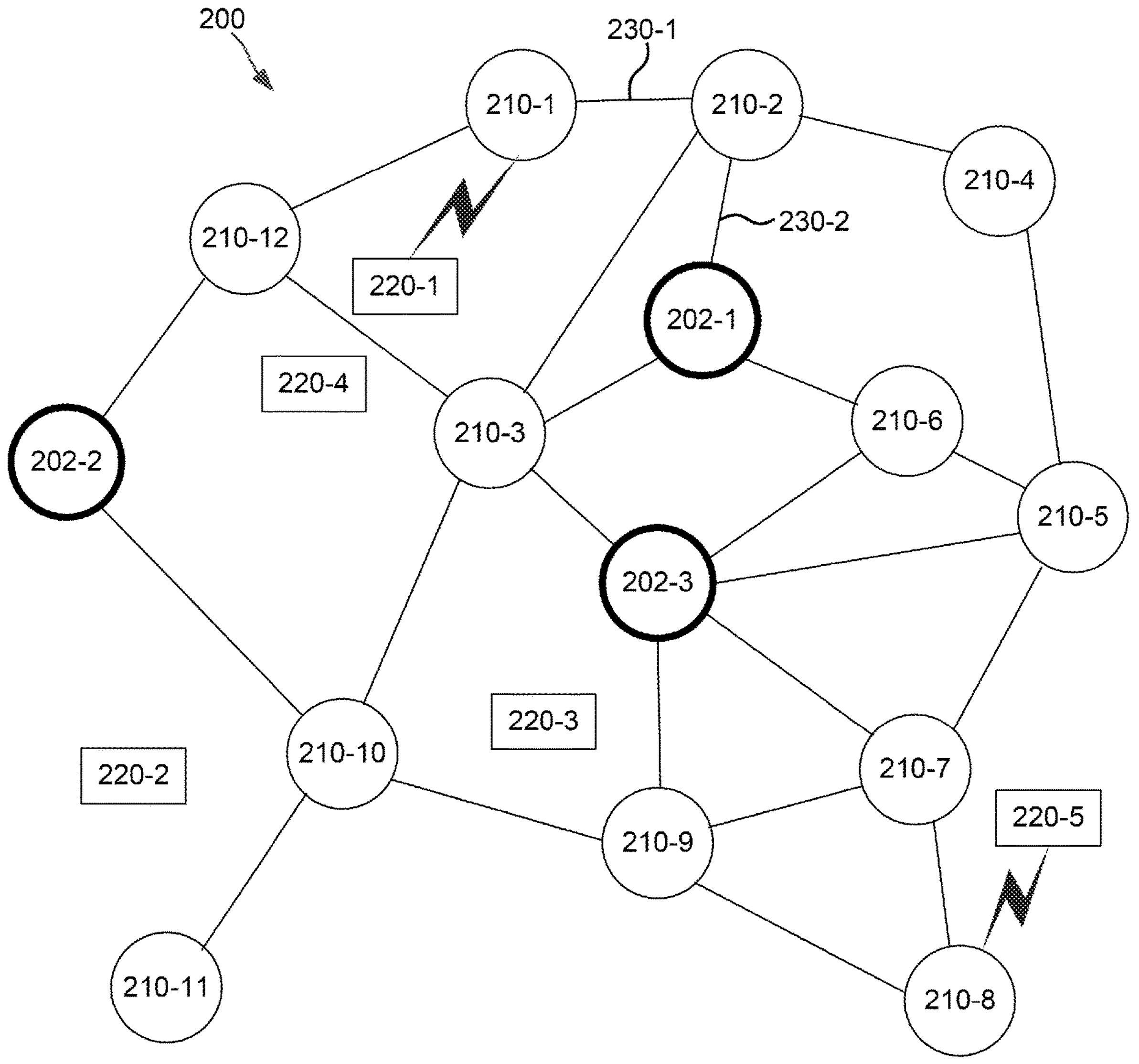
FIG. 2A is a schematic block diagram of a mesh WiFi network.

As discussed above, some WiFi networks are implemented in whole or part as so-called mesh networks. FIG. 2A is a schematic block diagram of such a mesh WiFi network 200. The Wifi network includes at least one root node 202. In the example of FIG. 2A, three root nodes 202-1 through 202-3 are shown. Each root node 202 may comprise, for example, an access point or another electronic device such as a router. Each root node 202 may be coupled to one or more external networks via a wired connection to provide wired backhaul to such networks (the external network is not shown in FIG. 2A, but is shown as external network 140 in FIG. 1). The mesh WiFi network 200 further includes a plurality of access points 210, which may also be referred to herein as "nodes." A total of twelve access points 210-1 through 10-12 are shown in the example of FIG. 2A. Each access point 210 is capable of communicating; with at least one other access point 210 and/or with a root node 202. Each access point 210 may communicate with one or more client devices 120 (see FIG. 1) in the manner described above with reference to FIG. 1. Five example client devices 220-1 through 220-5 are depicted in FIG. 2A.

In some cases, all of the access points 210 in mesh WiFi network 200 are only connected to other access points 210 via respective wireless connections. Herein, an access point that is only connected to other access points 210 and root nodes 202 via wireless connections is referred to as a "mesh access point." In other embodiments, some of the access points 210 may be connected to other access points 210 via wired connections, while other of the connections between access points 210 may be wireless connections. In the example of FIG. 2A, the access points 210 are only connected to each other and to the root nodes 202 via wireless connections.

Each access point 210 may communicate with one or more of the client devices 220 using wireless communication that are compatible with an IEEE 802.11 standard. For example, a client device (e.g., client device 220-5) may associate with a particular access point (e.g., access point 210-8). The client device 220-5 may communicate with other client devices 220 and/or with external networks 140 via the access point 210-8.

As shown in FIG. 2A, each access point 210 is only connected to a subset of the other access points 210 and root nodes 202. This is typical in mesh WiFi networks, as each access point only has a limited transmission range, and hence can typically only communicate with a few other access points 210 and/or root nodes 202 that are in close proximity.

The mesh WiFi network 200 may operate as follows. A client device such as client device 220-5 may associate with one of the access points 210 (here access point 210-8). The client device 220-5 may then communicate with one or more external networks (e.g., the Internet, a cellular telephone network, etc.) and/or other client devices 220 via access point 220-8. Access point 210-8 receives communications from client device 220-5 and forwards these communications to a root node 202. In the discussion that follows, it will be assumed that the mesh network routing algorithms connect access point 210-8 to root node 202-3 for mesh backhaul traffic. Root node 202-3 may, for example, route these communications to the one or more external networks 140, and may receive responsive communications from the external networks 140 that are forwarded back to access point 210-8 and then provided to client device 220-5.

The data that is sent from access point 210-8 to root node 202-3 in response to receiving communications from client device 210-5, as well as the data forwarded from the root node 202-3 to access point 210-8 for provision to client device 220-5, is referred to as backhaul data. As can be seen in FIG. 2A, many different potential communication paths exist over which the backhaul data may be passed between access point 210-8 and root node 202-3. For example, access point 210-8 could forward mesh backhaul data to access point 210-9, and access point 210-9 could then forward this mesh backhaul data to root node 202-3. Alternatively, access point 210-8 could forward mesh backhaul data to access point 210-7, and access point 210-7 could then forward this mesh backhaul data to root node 202-3. While the above two communication paths appear to be the most direct communication paths between access point 210-8 and root node 202-3, other communication paths exist. For example, access point 210-8 could forward mesh backhaul data to access point 210-7, and access point 210-7 could then forward this mesh backhaul data to access point 210-5, and access point 210-5 could then forward the backhaul data to root node 202-3. Many other communication paths exist. Herein, a mesh access point 210 that forwards mesh backhaul data received from an associated client device 220 to a root node 202 is referred to as a "source" mesh access point 210. A mesh access point 210 that receives mesh backhaul data that is addressed to a client device 220 that is associated with the mesh access point 210 is referred to as a "destination" mesh access point 210. A mesh access point 210 that is along a communication path between a root node 202 and a source mesh access point 210 or a destination mesh access point 210 is referred to as an "intervening" mesh access point 210.

A wireless communication link between an access point and another access point or a root node may be referred to herein as a "hop." Since access point 210-8 is not directly connected to root node 202-3 via a wireless communication link (see FIG. 2A), the mesh backhaul data passing between access point 210-8 and root node 202-3 will necessarily be transmitted over at least a two-hop communication path. Mesh WiFi networks are typically designed to self-configure so that the mesh WiFi network automatically selects the communications path(s) used for each wireless backhaul communication. Thus, for example, access point 210-8 may self-determine whether to forward mesh backhaul communications to access point 210-7 or 210-9 based on, for example, estimates of mesh backhaul capability of access points 210-7 and 210-9 that are provided to access point 210-8. Upon receiving mesh backhaul data from access point 210-8, access point 210-7 (or 210-9) will then determine the best path for forwarding this mesh backhaul data to root node 202-3. The best path may or may not be the direct path between access point 210-7 (or 210-9) and root node 202-3 depending upon the throughput capabilities of the various different single hop and multi-hop communications links that connect access point 210-7 (or 210-9) to root node 202-3.

As described above, most existing WiFi networks support WiFi communications in two frequency bands, namely the 2.4 GHz frequency band and the 5 GHz frequency band. In conventional mesh WiFi networks, backhaul data is transmitted solely in either the 2.4 GHz frequency band or the 5 GHz frequency band. Typically, the default is to transmit mesh backhaul communications in the 5 GHz frequency band, given that the 5 GHz frequency band typically supports higher throughputs and often is subject to less congestion. However, mesh WiFi networks may, for example, be manually configured to transmit backhaul communications in the 2.4 GHz frequency band. Typically, when such manual configuration is performed, all of the access points in a given zone will be configured to transmit backhaul communications in the 2.4 GHz frequency band.

Figure 2B:
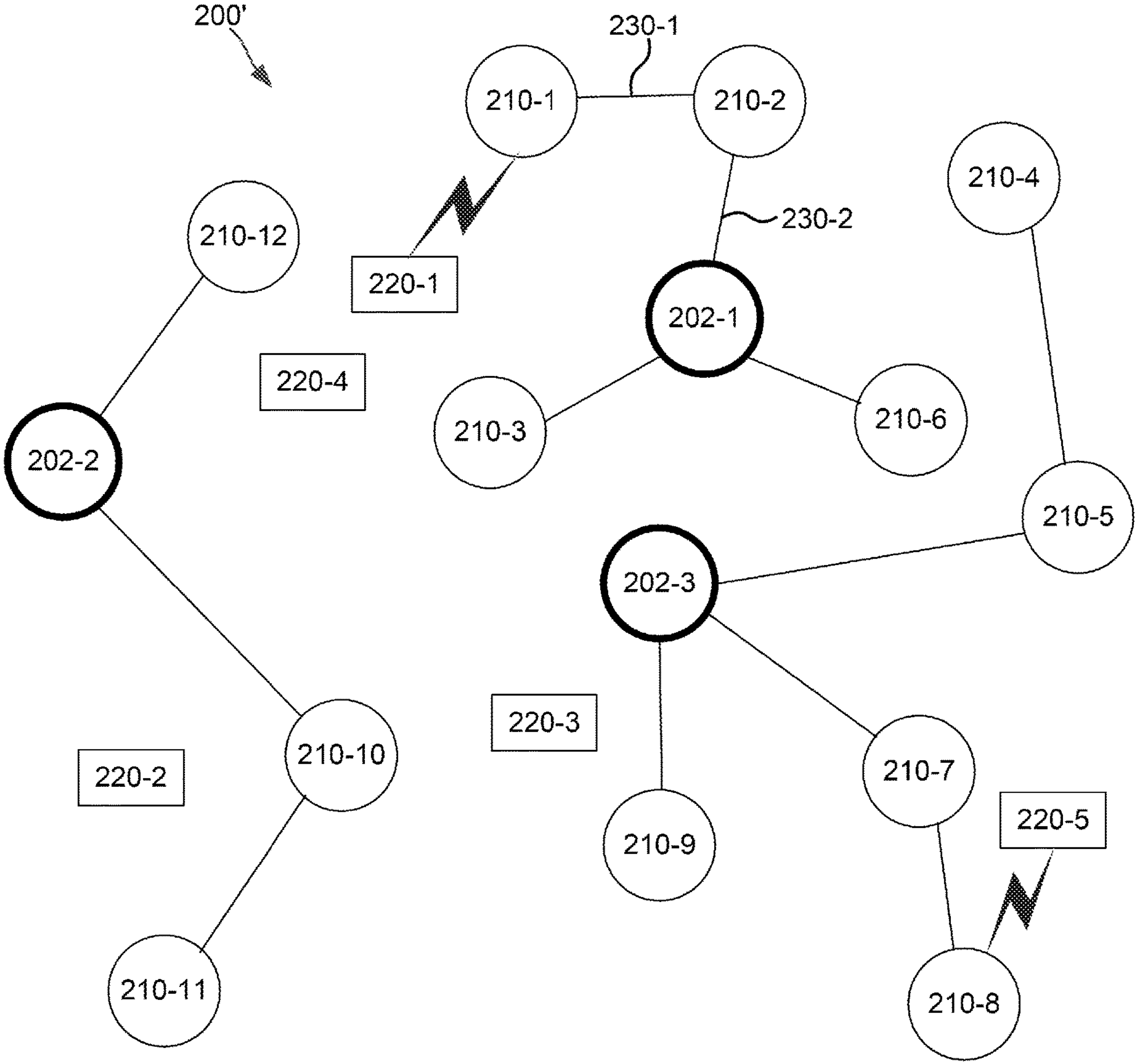
FIG. 2B is a schematic block diagram of another mesh WiFi network.

It will be appreciated that FIG. 2A illustrates a mesh WiFi network that has a star topology in which many of the non-root access points 210 have multiple upstream paths to a root node 202. In many cases, mesh networks may instead be implemented to have a tree topology in which non-root access points 210 may each only have one upstream path to a root node 202. The use of the tree topology may advantageously avoid loops. A mesh network 200' having such a tree topology is illustrated in FIG. 2B. The communication techniques according to embodiments of the present invention that are described herein may be performed on either mesh network topology.

Figure 3:
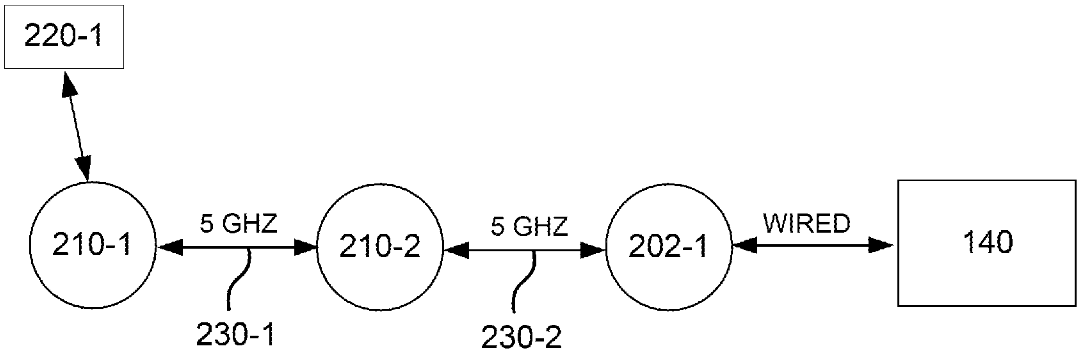
FIG. 3 is a schematic diagram illustrating a mesh backhaul communication path in a conventional mesh WiFi network.

FIG. 3 is a schematic diagram illustrating a mesh backhaul communication path in the conventional mesh WiFi network 200 of FIG. 2A. As shown in FIG. 3, client device 220-1 is associated with access point 210-1. Access point 210-1 may transmit first backhaul data associated with client device 220-1 to an intervening access point 210-2 over a first wireless communication link 230-1. The first wireless communications link 230-1 may be established in a channel in the 5 GHz frequency band. Intervening access point 210-2 may transmit the first backhaul data received from access point 210-1 to root node 202-1 over a second wireless communication link 230-2. The second wireless communications link 230-2 may also be established in a channel in the 5 GHz frequency band. Root node 202-1 may be connected to an external network 140. Root node 202-1 may transmit the first backhaul data to the external network 140 over, for example, a wired connection.

Root node 202-1 may also receive second backhaul data from the external network 140 that is addressed to client device 220-1. For example, client device 220-1 may request a web page, and the first backhaul data may comprise this request for the web page. The second backhaul data may comprise the web page, and may be transmitted from external network 140 to root node 202-1 over the above-referenced wired connection. Root node 202-1 may forward the second backhaul data to intervening access point 210-2 over the second wireless communications link 230-2, and intervening access point 210-2 may forward the second backhaul data to access point 210-1 over the first wireless communications link 230-1. Access point 210-1 may then wirelessly transmit the second backhaul data to client device 220-1.

As shown in FIG. 3, both the first and second communications links 230-1, 230-2 are established as channels in the 5 GHz frequency band. While different channels 230 in the 5 GHz frequency band may be used to establish the first and second communications links 230-1, 230-2, the same radio (namely the 5 GHz radio) in intervening access point 210-2 will be used to receive the first backhaul data over communications link 230-1 and to transmit the first backhaul data over communications link 230-2. Since the 5 GHz radio in intervening access point 210-2 cannot simultaneously receive and transmit data, the first backhaul data cannot be forwarded from intervening access point 210-2 to root node 202-1 at the same time that the first backhaul data is being received at access point 210-2 from access point 210-1. This limitation can limit the uplink throughput for backhaul data by as much as 50%. Likewise, the second backhaul data cannot be forwarded from intervening access point 210-2 to access point 210-1 at the same time that the second backhaul data is being received at access point 210-2 from root node 202-1. This limitation can similarly limit the downlink throughput for backhaul data by as much as 50%.

Figure 4:
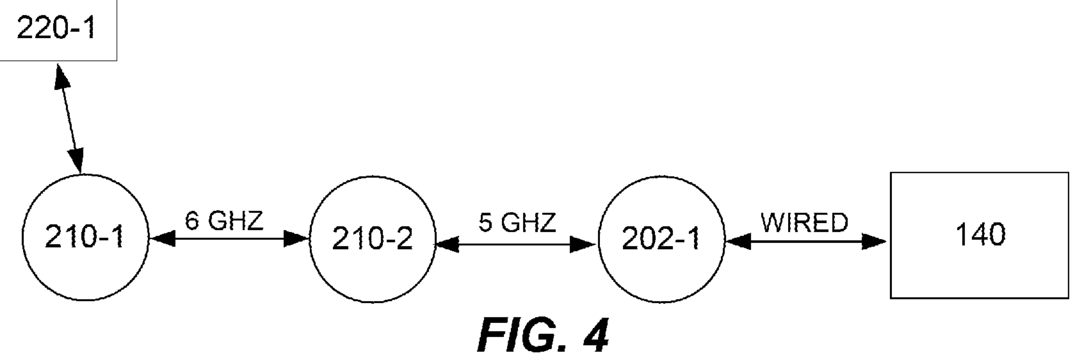
FIG. 4 is a schematic diagram illustrating a communications technique according to embodiments of the present invention.

As discussed above, pursuant to embodiments of the present invention, communications techniques are provided for transmitting mesh backhaul data in a WiFi network. FIG. 4 is a schematic diagram illustrating such a communications technique according to embodiments of the present invention. As shown in FIG. 4, the client device 220-1 again is associated with access point 210-1. Access point 210-1 transmits first backhaul data associated with client device 220-1 to intervening access point 210-2 over a first wireless communication link 230-1 that is in a first frequency band. Access point 210-1 may select the first frequency band for implementing the first wireless communication link 230-1 based on, for example, information indicating that the first frequency band can support higher capacity communications between source access point 210-1 and intervening access point 210-2. The intervening access point 210-2 may receive the first backhaul data received from access point 210-1 and may simultaneously start transmitting this first backhaul data to root node 202-1 over the second wireless communication link 230-2. The second wireless communication link 230-2 may be established in a channel in a second frequency band that is different from the first frequency band. For example, if the first frequency band is the 6 GHz frequency band, then the second frequency band may be the 5 GHz frequency band. Alternatively, if the first frequency band is the 5 GHz frequency band, then the second frequency band may be the 6 GHz frequency band. Root node 202-1 is connected to external network 140. Root node 202-1 may transmit the first backhaul data to external network 140 over, for example, a wired connection Root node 202-1 may also receive second backhaul data from external network 140 that is addressed to client device 220-1. Root node 202-1 may forward the second backhaul data to intervening access point 210-2 over the second wireless communications link 230-2, and intervening access point 210-2 may start to forward the second backhaul data received from root node 202-1 to access point 210-1 over the first wireless communications link 230-1. Such simultaneous communication is possible since intervening access point 210-2 is receiving the second backhaul data from root node 202-1 using a first radio and transmitting this second backhaul data to destination access point 210-1 using a second radio. Access point 210-1 may wirelessly transmit the second backhaul data to client device 220-1.

As shown in FIG. 4, intervening access point 210-2 receives backhaul data in a first frequency band using a first radio and retransmits the received backhaul data in a second (different) frequency band using a second radio. As such, intervening access point 210-2 can receive backhaul data over a first hop of a backhaul communications path while simultaneously retransmitting the received backhaul data over the next hop in the communications path since different radios are used for each hop. This may increase the throughput on the backhaul communications path. Additionally, since intervening access point 210-2 transmits and receives the first or second backhaul data in different frequency bands, the transmission of the backhaul data over the second hop does not cause substantial interference with the reception of the backhaul data over the first hop.

Figure 5:
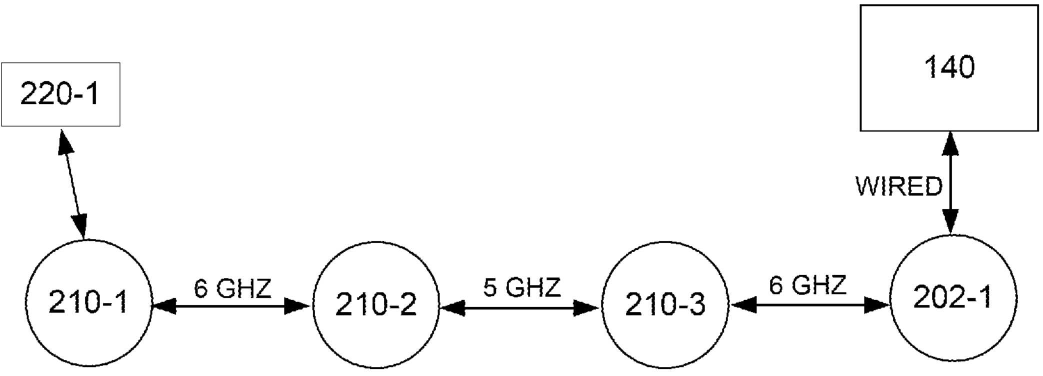
FIG. 5 is a schematic diagram illustrating a communications technique according to further embodiments of the present invention

FIG. 5 is a schematic diagram illustrating backhaul communications over a three hop backhaul communications path using the communications technique according to embodiments of the present invention. The example of FIG. 5 is very similar to the example of FIG. 4, except in FIG. 5 the communications paths between source/destination access point 210-1 and root node 202-1 includes a second intervening access point 210-3 that is on the communications path between the first intervening access point 210-2 and the root node 202-1 (see FIG. 2). As shown in FIG. 5, since intervening access point 210-3 receives the first backhaul data from intervening access point 210-2 in the 5 GHz frequency band, it forwards the first backhaul data to root node 202-1 over a wireless communications link in the 6 GHz frequency band. Similarly, since intervening access point 210-3 receives the second backhaul data from root node 202-1 in the 6 GHz frequency band, it forwards the second backhaul data to the first intervening access point 210-2 over a wireless communications link in the 5 GHz frequency band. If additional intervening access points 210 are provided, they may continue to alternate between the 5 GHz and 6 GHz frequency bands so that each adjacent hop in the communications path is transmitted in a different frequency band.

In the examples of FIGS. 4 and 5, adjacent hops for both downlink and uplink communications are transmitted in different frequency bands. It will be appreciated, however, that embodiments of the present invention are not limited thereto. For example, in other embodiments, only adjacent hops in the downlink direction may be transmitted in different frequency bands, whereas uplink hops are all transmitted in the same frequency band. In still other embodiments, only adjacent hops in the uplink direction are transmitted in different frequency bands, whereas downlink hops are all transmitted in the same frequency band. Other implementations are also possible.

While embodiments of the present invention have been discussed above with respect to implementing an alternating or "leap frog" technique for mesh backhaul communications using the 5 GHz and 6 GHz frequency bands, it will be appreciated that embodiments of the present invention are not limited thereto. For example, WiFi access points may be deployed that have a first radio that supports communication in the 2.4 GHz frequency band, a second radio that supports communication in the 5 GHz frequency band, and a third radio that supports communication in both the 6 GHz frequency band as well as at least a portion of the 5 GHz frequency band. Access points having such capabilities may be deployed so that they initially use one radio in the 2.4 GHz frequency band and two radios in the 5 GHz frequency band (e.g., a first radio that operates in the 5.170-5.330 GHz frequency band and a second radio that operates in the 5.490-5.835 GHz frequency band), but later can be configured to use one radio in each of 2.4 GHz, 5 GHz and 6 GHz frequency bands. This design may be beneficial for use in jurisdictions where WiFi service in the 6 GHz frequency band has not yet been authorized or in situations where few if any 6 GHz client devices are deployed. When access points having the above capabilities are deployed and configured to use one radio to support communications in the 5.170-5.330 GHz frequency band (the lower 5 GHz frequency band) and another radio to support communications in the 5.490-5.835 GHz frequency band (the upper 5 GHz frequency band), the above described communications techniques may be used where the mesh backhaul alternates between the lower and upper 5 GHz frequency bands.

Figure 6:
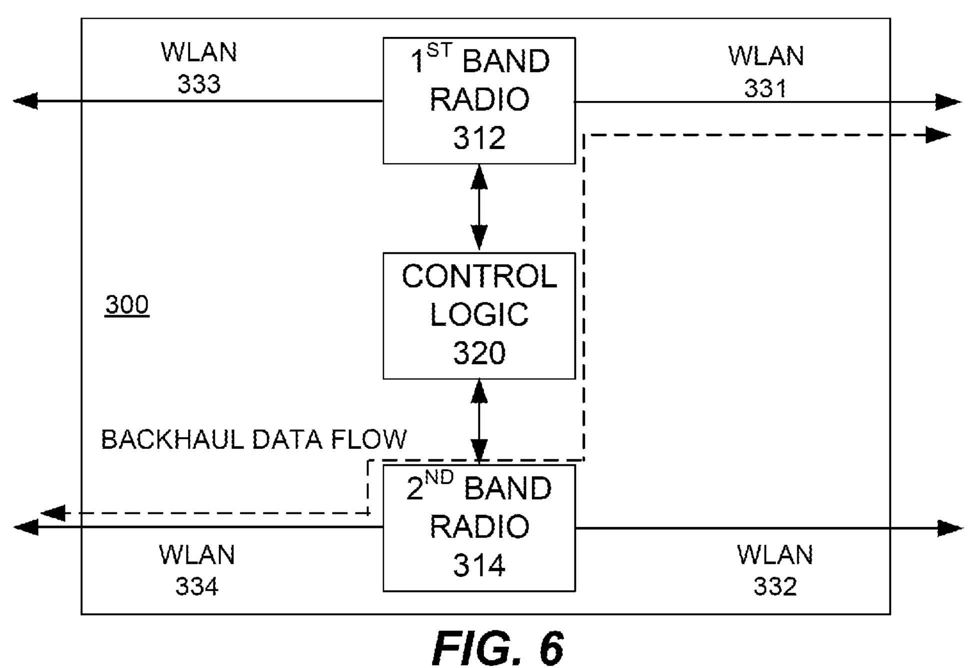
FIG. 6 is a block diagram of a mesh access point according to embodiments of the present invention.

FIG. 6 is a schematic block diagram of an access point 300 according to embodiments of the present invention. As shown in FIG. 6, the access point 300 includes a first frequency band radio 314 (e.g., a 5 GHz radio) and a second frequency band radio 316 (e.g., a 6 GHz radio). The first frequency band radio 314 and the second frequency band radio 316 may be part of an interface circuit of a networking subsystem of the access point (see FIG. 10). As described above, when the communications techniques according to embodiments of the present invention are enabled, control logic 320 in access point 300 may be configured to automatically select the “best” (e.g., highest capacity) frequency band (e.g., either the 5 GHz frequency band or the 6 frequency band) for uplink mesh backhaul communications. If the first frequency band is selected (e.g., the 5 GHz frequency band), then the control logic will create a first WLAN 331 for supporting the uplink mesh backhaul communications. If the second frequency band is instead selected (e.g., the 6 GHz frequency band), then the control logic will create a second WLAN 332 for supporting the uplink mesh backhaul communications. In either case, the control logic 320 may also be configured to automatically create a third WLAN 333 for supporting downlink mesh backhaul communications in the first frequency band and a fourth WLAN 334 for supporting downlink mesh backhaul communications in the second frequency band. The backhaul data flow through access point 300 is shown by the dashed line.

Figure 7:
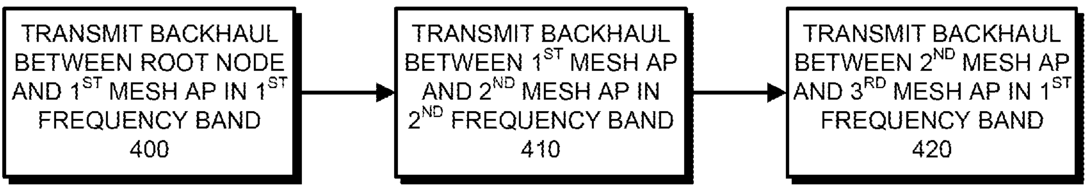
FIG. 7 is a flow chart illustrating a method of transmitting mesh backhaul data in a WiFi network according to embodiments of the present invention.

FIG. 7 is a flow chart illustrating a method of transmitting mesh backhaul data in a WiFi network according to embodiments of the present invention. As shown in FIG. 7, operations may begin with mesh backhaul data being transmitted between a root node and a first intervening mesh access point via a wireless communication in a first frequency band (Block 400). The first frequency band may be, for example, one of the 5 GHz frequency band or the 6 GHz frequency band. The mesh backhaul data may then be transmitted between the first mesh access point and a second mesh access point via a wireless communication in a second frequency band (Block 410). The second frequency band may be, for example, the other of the 5 GHz frequency band and the 6 GHz frequency band. It should be noted that the steps of Blocks 400 and 410 may partially overlap so that a second portion of the mesh backhaul data may be is transmitted between the first mesh access point and the second mesh access point at the same time that a first portion of the mesh backhaul is transmitted between the root node and the first mesh access point.

In some cases, the mesh backhaul data may be downlink mesh backhaul data. In this situation, the second mesh access point may be a destination access point for the downlink mesh backhaul data, or may be a second intervening mesh access point. In other cases, the mesh backhaul data may be uplink mesh backhaul data. In this situation, the second mesh access point may be a source access point for the uplink mesh backhaul data, or may be a second intervening mesh access point. In cases where the second mesh access point is a second intervening mesh access point, then the mesh backhaul data (uplink or downlink) may further be transmitted between the second intervening mesh access point and a third mesh access point via a wireless communication in the first frequency band (Block 420).

Figure 8:
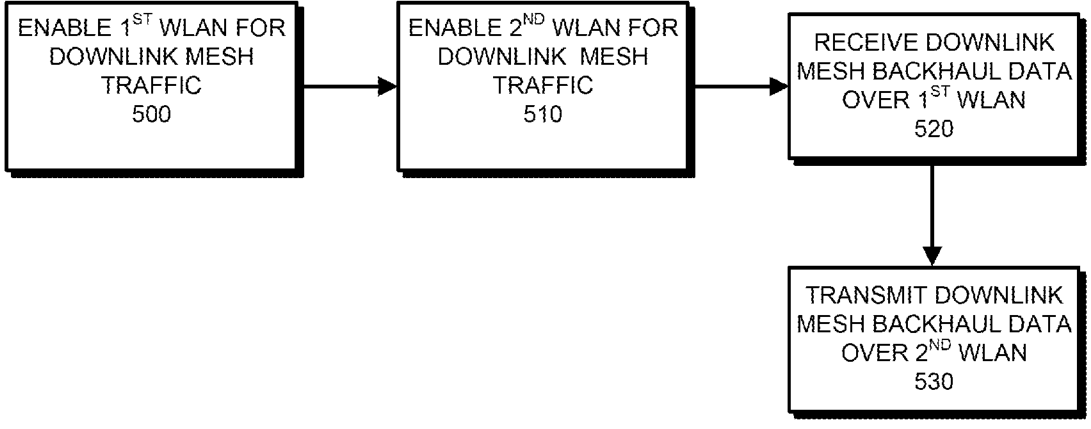
FIG. 8 is a flow chart illustrating a method of operating an access point according to embodiments of the present invention.

FIG. 8 is a flow chart illustrating a method of operating an access point according to further embodiments of the present invention. Pursuant to this method, a first wireless local area network is enabled for mesh downlink traffic, where the first wireless local area network supports wireless communication in a first frequency band (Block 500). A second wireless local area network is enabled for mesh downlink traffic, where the second wireless local area network supports wireless communication in a second frequency band that is different from the first frequency band (Block 510). Downlink mesh backhaul data is received over the first wireless local area network (Block 520). The received downlink mesh backhaul data is transmitted over the second wireless area network (Block 530). A first portion of the downlink mesh backhaul data may be transmitted over the second wireless local area network at the same time that a second portion of the downlink mesh backhaul data is received over first wireless local area network. In example embodiments, the first frequency band may be one of the 5.170-5.835 GHz frequency band and a 5.935-7.125 GHz frequency band, and the second frequency band may be the other of the 5.170-5.835 GHz frequency band and the 5.935-7.125 GHz frequency band.

Figure 9:
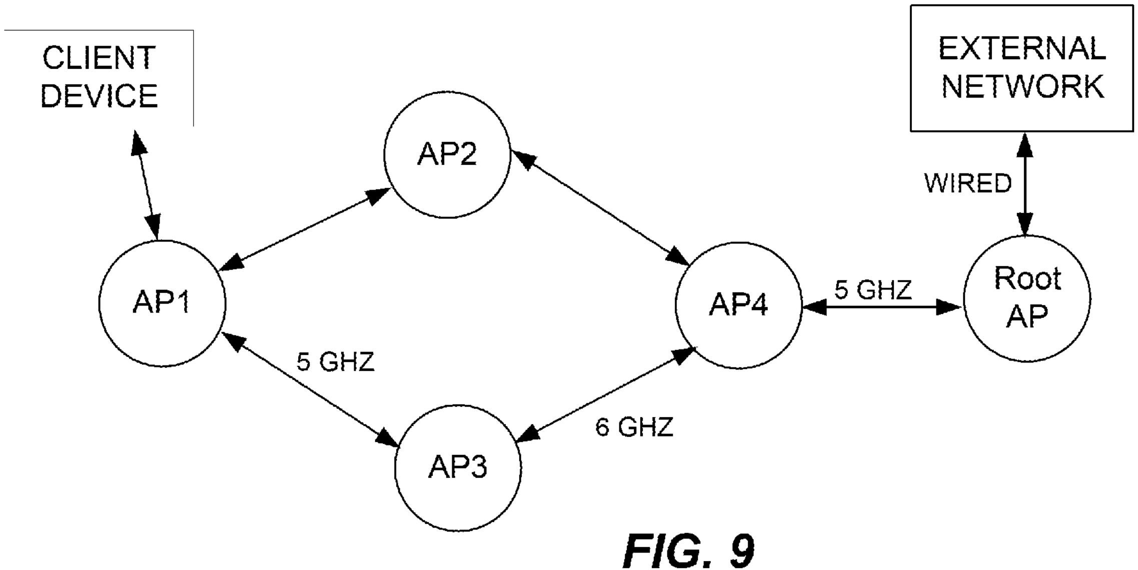
FIG. 9 is a schematic representation of a portion of a mesh WiFi network that illustrates a communications technique according to embodiments of the present invention.

FIG. 9 is a schematic representation of a portion of a mesh WiFi network 600. The illustrated portion of the WiFi network 600 includes a root node 602 and four access points 610-1 to 610-4. A client device 620 is associated with access point 610-1. The leap frog backhaul communications techniques according to embodiments of the present invention may be implemented in WiFi network 600 as follows.

First, access point 610-4 may select one of the 5 GHz and 6 GHz frequency bands for backhaul communications with the root access point 602. The selected frequency band will be used for both uplink and downlink backhaul communications between access point 610-4 and root access point 602. Access point 610-4 may selects between the 5 GHz and 6 GHz frequency bands based on an estimate as to which frequency band will support greater backhaul throughput to root access point 602. For purposes of this example, it is assumed that the 5 GHz frequency band was selected by access point 610-4 for all backhaul communications with the root access point 602. After making this selection, access point 610-4 may advertise the selection of the 5 GHz frequency band for upstream backhaul communications in an information element field of its beacon. Access point 610-4 may also enable a 5 GHz WLAN for supporting upstream backhaul communications with root access point 602, and may enable both a 5 GHz WLAN and a 6 GHz WLAN for supporting backhaul communications with downstream access points (here access points 610-2, 610-3).

Access point 610-2 may then select one of the 5 GHz and 6 GHz frequency bands for its uplink and downlink backhaul communications with access point 610-4. As described above, in some embodiments, access point 610-2 may select between the 5 GHz and 6 GHz frequency bands based on an estimate as to which frequency band will support greater throughput, while in other embodiments access point 610-2 may select the frequency band that was not selected by access point 610-4. In practice, the selected frequency band will almost always be the opposite of the frequency band used by access point 610-4 for its backhaul communications with Root access point 602. Thus, in this example, access point 610-2 selects the 6 GHz frequency band for its upstream backhaul communications. Access point 610-2 advertises in the information element field of its beacon that it will use the 6 GHz frequency band for its upstream backhaul communications, and also enables a 6 GHz WLAN for supporting upstream backhaul communications with the root access point 602, and enables both a 5 GHz WLAN and a 6 GHz WLAN for supporting backhaul communications with downstream access point 610-1. Access point 610-3 may also perform each of the same steps performed by access point 610-2.

Access point 610-1 selects one of access points 610-2 and 610-3 for backhaul communications based on, for example, an estimation as to which access point 610-2, 610-3 is deemed to have a higher backhaul capacity to root access point 602. Here, it is assumed that access point 610-3 is selected. Access point 610-1 then selects one of the 5 GHz and 6 GHz frequency bands for its uplink and downlink backhaul communications with access point 610-3 in, for example, the same manner that access point 610-3 makes this selection, as described above. In this example, access point 610-1 selects the 5 GHz frequency band for its upstream backhaul communications so that adjacent hops for the backhaul communications alternate between the 5 GHz and 6 GHz frequency bands.

At some point, client device 620 associates with access point 610-1 and transmits a request thereto (e.g., a request for a web page) that requires uplink backhaul communications. Access point 610-1 forwards the request for the web page to access point 610-3 over a first 5 GHz channel, access point 610-3 forwards the request for the web page to access point 610-4 over a first 6 GHz channel, and access point 610-4 forwards the request for the web page to the root access point 602 over a second 5 GHz channel. Root access point 602 requests the web page from an external network 140 and then forwards the retrieved web page to access point 610-4 over the second 5 GHz channel. Access point 610-4 then forwards the retrieved web page to access point 610-3 over the first 6 GHz channel, access point 610-3 forwards the retrieved web page to access point 610-1 over the first 5 GHz channel, and access point 610-1 forwards the retrieved web page to client device 620.

Figure 10:
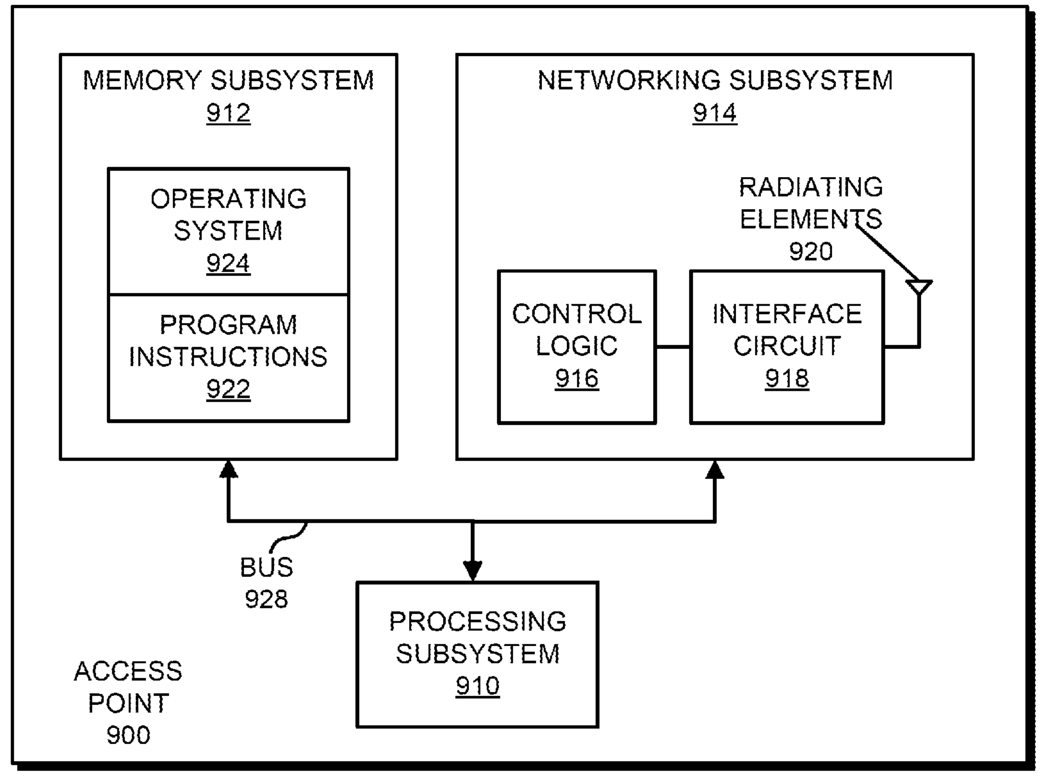
FIG. 10 is a block diagram of an access point according to embodiments of the present invention.

FIG. 10 is a block diagram illustrating an access point 900 in accordance with some embodiments. The access point 900 includes a processing subsystem 910, a memory subsystem 912, and a networking subsystem 914. Processing subsystem 910 includes one or more devices configured to perform computational operations. Memory subsystem 912 includes one or more devices for storing data and/or instructions. In some embodiments, the instructions may include an operating system and one or more program modules which may be executed by processing subsystem 910.

Networking subsystem 914 includes one or more devices configured to couple to and communicate on a wired and/or wireless network (i.e., to perform network operations), including: control logic 916, an interface circuit 918 and one or more radiating elements 920. Thus, electronic device 900 may or may not include the one or more radiating elements 920. Networking subsystem 914 includes at least a networking system based on the standards described in IEEE 802.11 (e.g., a Wi-Fi networking system).

Networking subsystem 914 includes processors, controllers, radios/radiating elements, sockets/plugs, and/or other devices used for coupling to, communicating on, and handling data and events for each supported networking system. Note that mechanisms used for coupling to, communicating on, and handling data and events on the network for each network system are sometimes collectively referred to as a "network interface" for the network system. Access point 900 may use the mechanisms in networking subsystem 914 for performing simple wireless communication, e.g., transmitting frames and/or scanning for frames transmitted by other electronic devices.

Processing subsystem 910, memory subsystem 912, and networking subsystem 914 are coupled together using bus 928. Bus 928 may include an electrical, optical, and/or electro-optical connection that the subsystems can use to communicate commands and data among one another.

The operations performed in the communication techniques according to embodiments of the present invention may be implemented in hardware or software, and in a wide variety of configurations and architectures. For example, at least some of the operations in the communication techniques may be implemented using program instructions 922, operating system 924 (such as a driver for interface circuit 918) or in firmware in interface circuit 918. Alternatively or additionally, at least some of the operations in the communication techniques may be implemented in a physical layer, such as hardware in interface circuit 918.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. A method of transmitting mesh backhaul data in a WiFi network, the method comprising:

transmitting the mesh backhaul data between a root node and a first intervening mesh access point via a wireless communication in a first frequency band; and transmitting the mesh backhaul data between the first intervening mesh access point and a second mesh access point via a wireless communication in a second frequency band that is different than the first frequency band, wherein the mesh backhaul data is transmitted between the first intervening mesh access point and the second mesh access point via wireless communication in the second frequency band based on the mesh backhaul data having been transmitted between the root node and the first intervening mesh access point via wireless communication in the first frequency band.

2. The method of claim 1, wherein the mesh backhaul data is downlink mesh backhaul data, and the second mesh access point is a destination for the downlink mesh backhaul data.

3. The method of claim 1, wherein the mesh backhaul data is downlink mesh backhaul data and the second mesh access point is a second intervening mesh access point, the method further comprising transmitting the downlink mesh backhaul data between the second intervening mesh access point and a third mesh access point via a wireless communication in the first frequency band.

4. The method of claim 1, wherein the mesh backhaul data is uplink mesh backhaul data, and the second mesh access point is a source of the uplink mesh backhaul data.

5. The method of claim 1, wherein the mesh backhaul data is uplink mesh backhaul data and the second mesh access point is a second intervening mesh access point, the method further comprising transmitting the uplink mesh backhaul data between the second intervening mesh access point and a third mesh access point via a wireless communication in the first frequency band, wherein the uplink mesh backhaul data is first transmitted from the third mesh access point to the second intervening mesh access point, and then is transmitted from the second intervening mesh access point to the first intervening mesh access point, and then is transmitted from the first intervening mesh access point to the root node.

6. The method of claim 1, wherein a second portion of the mesh backhaul data is transmitted between the first intervening mesh access point and the second mesh access point at the same time that a first portion of the mesh backhaul data is transmitted between the root node and the first intervening mesh access point.

7. The method of claim 1, wherein the first frequency band is one of a 5.170-5.835 GHz frequency band and a 5.935-7.125 GHz frequency band, and the second frequency band is the other of the 5.170-5.835 GHz frequency band and the 5.935-7.125 GHz frequency band.

8. The method of claim 1, wherein the first frequency band is one of a 5.170-5.330 GHz frequency band and a 5.490-5.835 GHz frequency band, and the second frequency band is the other of the 5.170-5.330 GHz frequency band and the 5.490-5.835 GHz frequency band.

9. The method of claim 1, wherein the first intervening mesh access point selects the first frequency band for exchanging mesh backhaul data with the root node, and advertises the selection of the first frequency band in a beacon.

10. The method of claim 9, wherein the second mesh access point selects the second frequency band for exchanging mesh backhaul data with the first intervening mesh access point based on the advertisement of the selection of the first frequency band in the beacon.

11. A method of operating an access point, the method, comprising:

enabling a first wireless local area network for mesh traffic, where the first wireless local area network supports wireless communication in a first frequency band;

enabling a second wireless local area network for mesh traffic, where the second wireless local area network supports wireless communication in a second frequency band that is different from the first frequency band;

receiving mesh backhaul data over the first wireless local area network; and transmitting the mesh backhaul data over the second wireless area network, wherein a first portion of the mesh backhaul data is transmitted over the second wireless local area network at the same time that a second portion of the mesh backhaul data is received over the first wireless local area network.

12. The method of claim 11, wherein the first frequency band is one of a 5.170-5.835 GHz frequency band and a 5.935-7.125 GHz frequency band, and the second frequency band is the other of the 5.170-5.835 GHz frequency band and the 5.935-7.125 GHz frequency band.

13. The method of claim 11, wherein the first frequency band is one of a 5.170-5.330 GHz frequency band and a 5.490-5.835 GHz frequency band, and the second frequency band is the other of the 5.170-5.330 GHz frequency band and the 5.490-5.835 GHz frequency band.

14. The method of claim 11, further comprising selecting one of the first frequency band and the second frequency band for uplink mesh backhaul data communication.

15. The method of claim 11, further comprising enabling a third wireless local area network for mesh downlink traffic, where the third wireless local area network supports wireless communication in the first frequency band.

16. An access point, comprising:

at least one antenna; and an interface circuit, coupled to the at least one antenna, the interface circuit configured to:

enable a first wireless local area network in a first frequency band for mesh backhaul data;

enable a second wireless local area network in a second frequency band for mesh backhaul data, the second frequency band being different than the first frequency band;

receive mesh backhaul data on the first wireless local area network; and transmit the mesh backhaul data on the second wireless local area network, wherein the interface circuit is further configured so that the access point can receive mesh backhaul data on the first wireless local area network while simultaneously transmitting the mesh backhaul data on the second wireless local area network.

17. The access point of claim 16, wherein the first wireless local area network supports uplink communications and the second wireless local area network supports downlink communications.

18. The access point of claim 16, wherein the first frequency band is one of a 5.170-5.835 GHz frequency band and a 5.935-7.125 GHz frequency band, and the second frequency band is the other of the 5.170-5.835 GHz frequency band and the 5.935-7.125 GHz frequency band.

19. The access point of claim 16, wherein the first frequency band is one of a 5.170-5.330 GHz frequency band and a 5.490-5.835 GHz frequency band, and the second frequency band is the other of the 5.170-5.330 GHz frequency band and the 5.490-5.835 GHz frequency band.

20. The method of claim 11, wherein the mesh backhaul data is downlink mesh backhaul data.

* * * * *